Patented Mar. 13, 1923.

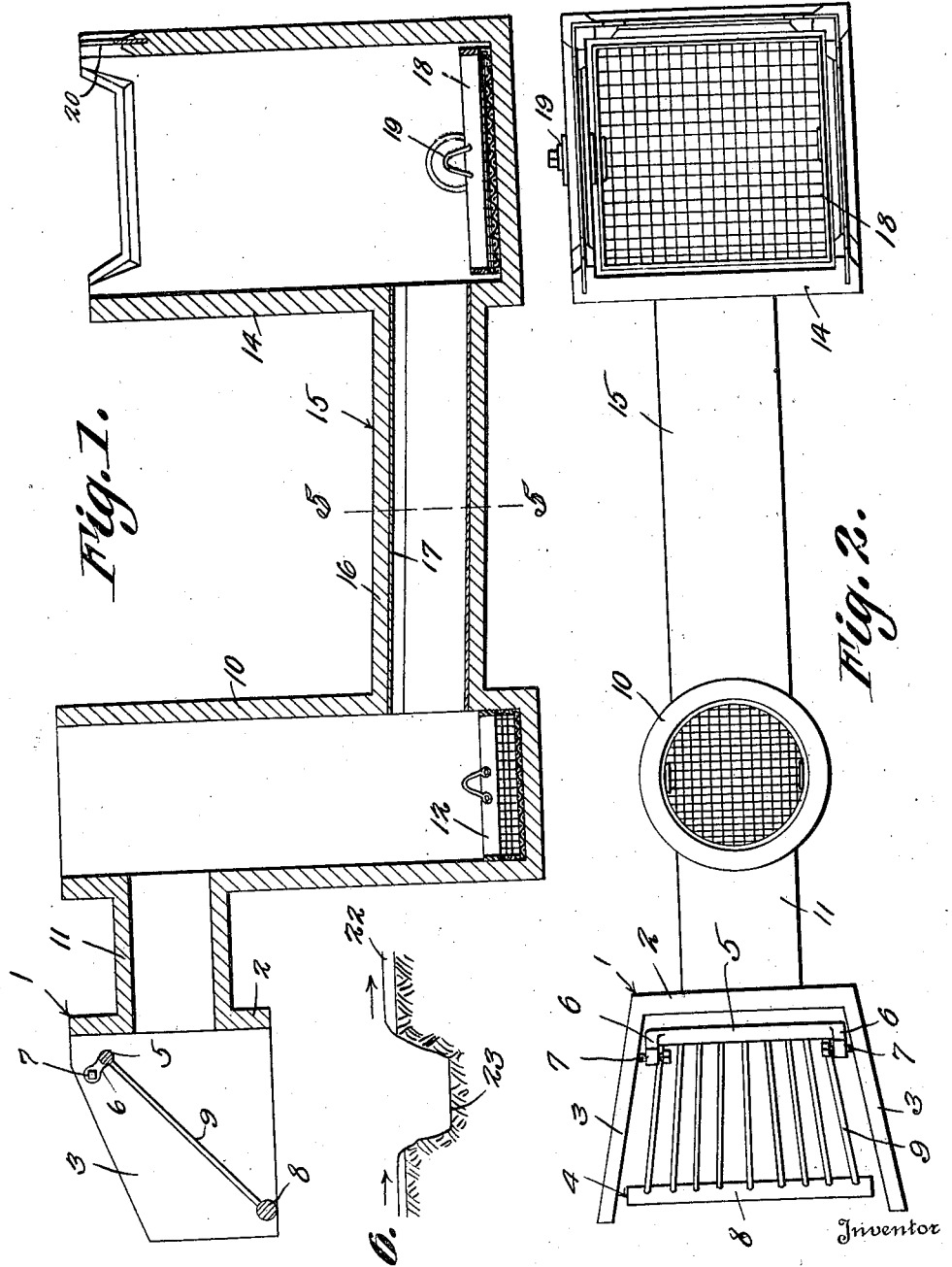

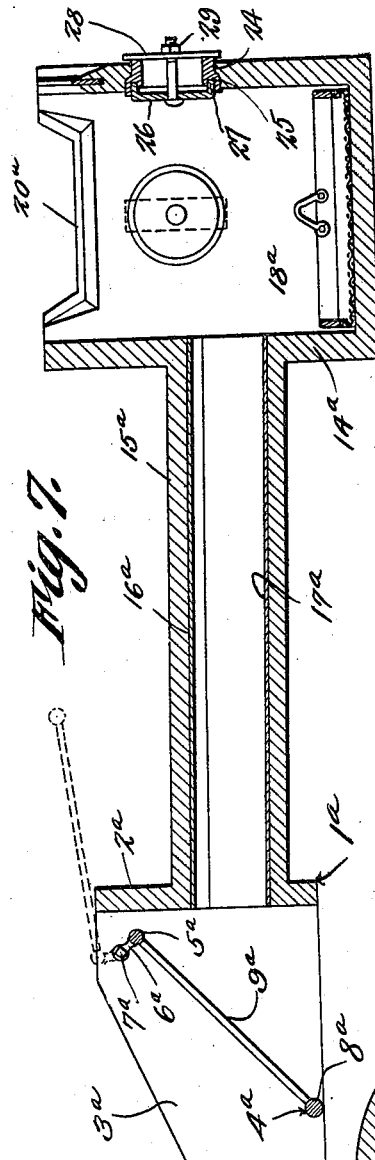
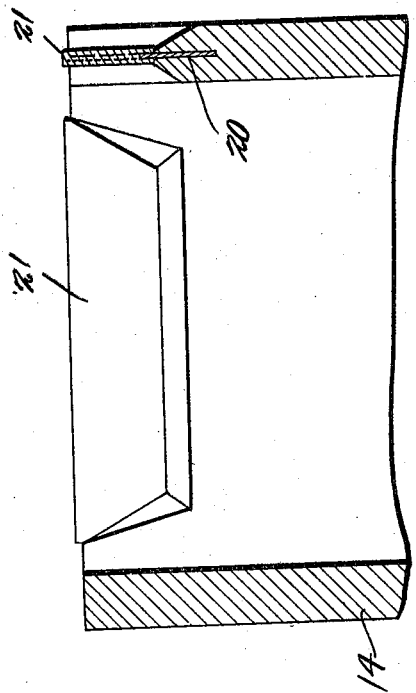
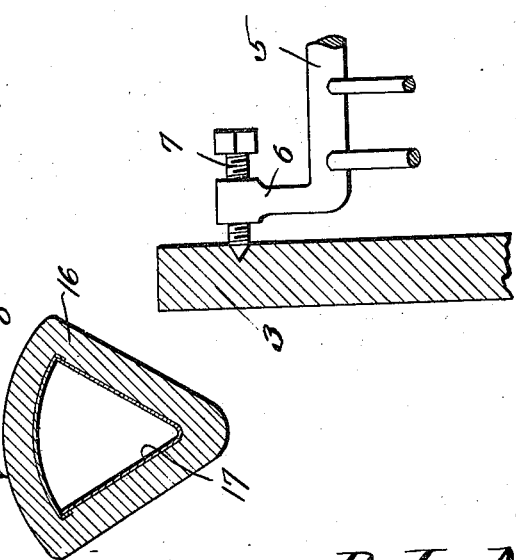

1,448,262

UNITED STATES PATENT OFFICE.

THOMAS DE LA MARE, OF TOOELE, UTAH.

DEVICE FOR WATER DISTRIBUTION.

Application filed March 11, 1921. Serial No. 451,429.

*To all whom it may concern:*

Be it known that I, THOMAS DE LA MARE, a citizen of the United States, residing at Tooele, in the county of Tooele and State of Utah, have invented a new and useful Device for Water Distribution, of which the following is a specification.

The device forming the subject matter of this application is adapted to be used for various purposes in connection with irrigation, for instance, for carrying a stream of water under a roadway, or for receiving and distributing water from a ditch.

The invention aims to provide novel means for receiving conducting and distributing water under conditions above alluded to and set forth in detail hereinafter.

It is within the province of the disclosure to improve generally and to enhance the utility of devices of that type to which the invention appertains.

Within the scope of what is claimed, a mechanic may work changes in the precise structure depicted and described, without departing from the spirit of the invention, and, therefore, I do not bind myself to the use of the particular form selected as illustrative.

In the drawings:—Figure 1 shows in vertical longitudinal section, a device constructed in accordance with the invention; Figure 2 is a top plan; Figure 3 is a sectional detail showing a portion of the screen; Figure 4 is a cross section through one well, a dam plate appearing as an added detail; Figure 5 is a cross section on the line 5—5 of Figure 1; Figure 6 is a diagrammatic section referred to in the description of the application of the invention; Figure 7 is a vertical longitudinal section showing a modified form of the invention.

Referring to Figures 1 to 6, the numeral 1 designates a portal, including a cross wall 2 and wings 3. A screen 4 is mounted for vertical swinging movement between the wings 3 and includes a top bar 5 having angular arms 6 wherein pivot screws 7 are threaded, the screws being pointed to facilitate the mounting of the screws in the wings 3, as shown in Figure 3. The screen embodies a bottom bar 8 and slats or rods 9 connecting the bar 8 with the bar 5. The screen commonly rests in the inclined position shown in Figure 1 and prevents the entrance of much trash into the device. To facilitate cleaning, the screen may be swung over on top of the cross wall of the portal, as shown in dotted line in Figure 7.

A first well 10 is spaced from the portal 1 and is considerably deeper than the portal, a pipe 11 establishing communication between the portal and the well. In the form shown in Figure 1, the pipe 11 is located relatively near to the top of the well 10. In the bottom of the well 10 is located a removable receptacle or basket 12, adapted to receive rocks and other material which may have been swept into the well 10 past the screen 9.

A second well 14 is spaced from the well 8, a removable receptacle or basket 18 being located in the bottom of the second well and serving, like the basket 12, to receive trash, it being clear that when it is desired to clean the wells, the baskets or receptacles simply may be hoisted out. The well 10 is connected with the well 14 by a pipe 15 located adjacent the bottoms of the wells, but above the upper edges of the receptacles 12 and 18. The pipe 15 has a marked slope from the well 10 to the well 14, to facilitate the flow of water in the pipe. The pipe 15 is approximately triangular in cross section, as shown in Figure 5, and may include a body 16 and a metal lining 17 therein. Owing to the specific cross sectional form of the pipe 15, the pipe will scour itself readily, and remain practically clean. A gate 19 is located in the well 14, near to the bottom thereof. The gate 19 may be opened in the winter time, to permit the device to drain, thereby avoiding injury arising out of the freezing of the water. Any suitable means may be provided for conducting the water from the well 14. It may not be desirable to distribute the water directly from the well 14, but if such a distribution is desirable, the well may be supplied at its top with weirs 20. Sometimes the supply of water will not be sufficient to warrant all of the weirs to be open at once, and under such circumstances, one or more of the weirs may be closed by a removable dam plate 21, shown in Figure 4, and seated in the weir Referring to Figure 6, a word or two concerning the application of the invention, may be in order. Ordinarily, an irrigation ditch 22 is carried along the crest of a hill, ridge or height of land, so that the lateral ditches may slope properly to carry the water to the places of application. If a roadway, railroad cut or the like, indicated at 23, is made in the height of land, the main ditch 22 is interrupted. It is under such circumstances, that the device shown in Figure 1 comes into use. The well 10 is located on one side of the cut, the well 14 is located on the opposite side of the cut, and the pipe 15 passes below the cut. The portal 1 collects the water, the water being delivered into the well 10 through the pipe 11, and passing into the well 14 by way of the pipe 15. The water rises in the well 14 to the height of the outlet, and reenters the ditch 22 or is distributed otherwise. Generally considered, the device shown in Figure 1 comprises a well 14, a portal 1, and a conduit connecting the portal with the well, the conduit including the parts 11, 10 and 15.

Passing to Figure 7, parts hereinbefore described are designated by numerals previously used, with the suffix "a". The well 10 is omitted, the pipe 15$^a$ constituting a conduit connecting the portal 1$^a$ with the well 14$^a$. If water is plentiful, there is no occasion for distributing the water accurately by the miners inch over the weirs 20$^a$, and then, the gate shown in Figure 7 may be opened, permitting a free flow. There may be as many gates as desired, each gate including a tube 24 mounted in the wall of the well, the tube having a groove 25 in its inner end. A closure plate 26 is provided, and includes a flange 27 received in the groove 25. A bridge bar 28 extends across the outer end of the tube 24, and a clamp bolt 29 connects the bridge bar with the closure plate and holds the flange 27 of the closure plate seated watertight, or nearly so, in the groove 25.

The structure shown in Figure 7 is used for collecting water from an irrigation ditch, by way of the portal 1$^a$, the water being distributed from the well 14$^a$ by the weirs 20$^a$, or through the gates of which the plates 26 form part.

Many uses, other than those alluded to, will suggest themselves to persons engaged in the construction and maintenance of irrigation works.

I claim:—

1. In a device of the class described, a well having an outlet; a portal; a conduit connecting the portal with the well; a removable receptacle in the well, below the conduit; and a screen in the portal and guarding the conduit, the screen being movable to give access to the conduit.

2. In a device of the class described, spaced wells, one of which is provided with an outlet; a pipe connecting the wells adjacent to the bottoms of the wells, but in spaced relation thereto; a portal; a pipe leading from the portal to the upper portion of the other well; and removable receptacles in the wells, below the first specified pipe.

3. In a device of the class described, spaced wells, one of which is provided with an outlet; a pipe connecting the wells adjacent to the bottoms of the wells, but in spaced relation thereto; a portal comprising a cross wall and wings; a pipe leading from the cross wall of the portal to the upper portion of the other well; and a screen in the portal, between the wings, and inclined to resist the flow through the portal, the screen being mounted pivotally at its end on the wings, whereby the screen may be swung out of the portal and on top of the cross wall, thereby affording access to the last specified pipe.

4. In a device of the class described, a portal comprising a cross wall and wings; a well; a pipe leading from the cross wall of the portal to the well; a gate in the portal, between the wings, the gate comprising an off set portion which is pivoted to the wings, the gate being adapted to be swung out of the portal, and to rest on the cross wall, the off set portion of the gate permitting the gate to rest on the cross wall in an approximately horizontal position.

In testimony that I claim the foregoing as my own, I have hereto affixed my signature in the presence of two witnesses.

THOMAS DE LA MARE.

Witnesses:
F. L. SEARCH,
MASON B. LAWTON.